Figure 1:
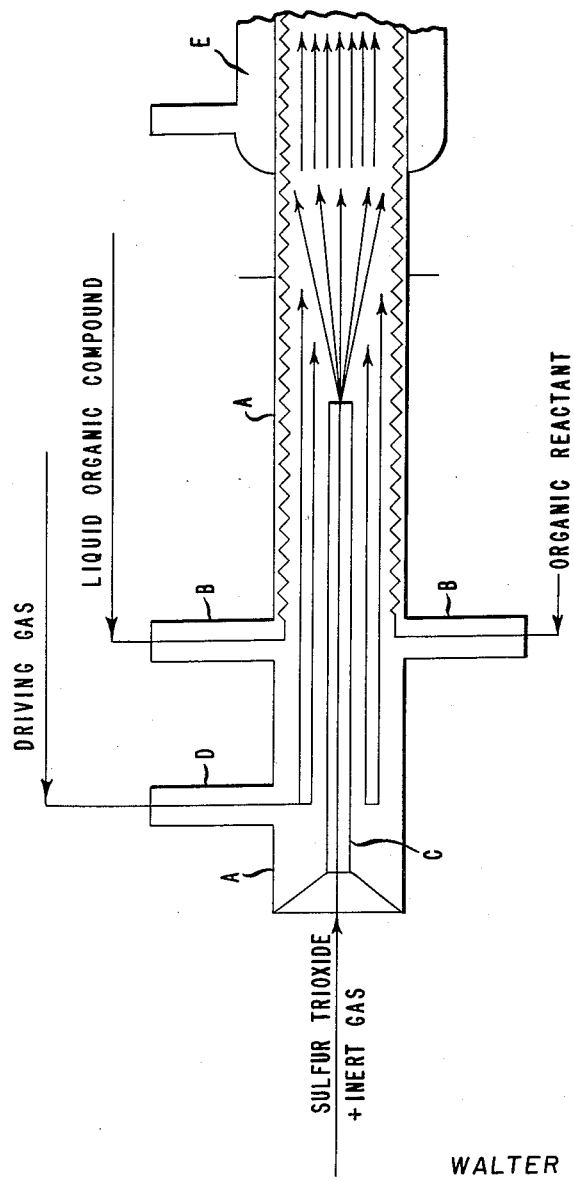

Feb. 2, 1960 K. FALK ET AL 2,923,728
PROCESS OF REACTING ORGANIC COMPOUNDS WITH SULFUR TRIOXIDE
Filed Nov. 19, 1957 2 Sheets-Sheet 2

Fig. II

INVENTORS
KLAUS FALK
WALTER RENOLD TAPLIN

BY *Walter H. Steinbauer*

ATTORNEY

United States Patent Office 2,923,728
Patented Feb. 2, 1960

2,923,728
PROCESS OF REACTING ORGANIC COMPOUNDS WITH SULFUR TRIOXIDE

Klaus Falk, Wilmington, and Walter Renold Taplin, New Castle, Del., assignors to E. I. du Pont de Nemours and Company, Wilmington, Del., a corporation of Delaware Application November 19, 1957, Serial No. 697,451

4 Claims. (Cl. 260—459)

This invention is directed to a continuous process for the reaction of sulfur trioxide with organic compounds. In particular, this invention deals with a process whereby sulfur trioxide is reacted with an organic compound in a novel manner, achieving greater ease of operation, significant economies, to produce unexpectedly superior products than obtained heretofore.

The reaction of sulfur trioxide with organic compounds is well known, as for example the reaction of sulfur trioxide with alcohols whereby a sulfated alcohol is obtained. One of the problems faced in dealing with the reaction between organic compounds and sulfur trioxide is the dissipation of the heat of the reaction. Most frequently the reaction is so highly exothermic that the reacting organic compound is actually charred to some extent and this results in a contamination and discoloration of the product.

It is an object of the present invention to minimize this particular difficulty and to provide a process for the reaction of sulfur trioxide with organic compounds whereby charring is eliminated or significantly reduced. It is a further object of this invention to provide a practical and continuous process for the reaction of organic compounds with sulfur trioxide which is economical and which gives good yields of products of improved color.

These and other objects will become apparent in the following description and claims.

More specifically, the present invention is directed to a process for the reaction of sulfur trioxide and liquid organic compounds which comprises the use of a tubular reactor and conditions of (1) turbannular flow of the liquid organic compound established by means of an inert gas, (2) feeding into said tubular reactor a mixture of inert gas and 2–12% by volume of the gas mixture, of sulfur trioxide, said mixture of gases being introduced beyond the point of full turbannular flow, and said mixture being fed through a tube concentric with the reactor walls and (3) cooling the reaction mixture at the point and beyond where the sulfur trioxide contacts the organic compound.

The process of this invention is illustrated in the accompanying drawings. In Figure I, A is a tubular reactor, B is an inlet to the reactor through which the liquid organic compound is introduced, C is a tube concentric with the tubular reactor A through which sulfur trioxide and about ½ of the inert gas used in the process is introduced. The inert gas introduced with the sulfur trioxide is referred to as "vaporizing gas." D is another inlet to the reactor through which the balance of the inert gas is introduced. This gas stream functions to establish turbannular flow of the organic compound and is termed "driving gas." E is a water-cooled condenser or other cooling means surrounding the tubular reactor.

In starting out the process, the mixture of $SO_3$ and vaporizer gas is introduced through C and the driving gas is introduced through D. Then the liquid organic compound is fed through B. The mixture of $SO_3$ and vaporizing gas is about 4 to 24% by volume and when it leaves the concentric tube C, it becomes diluted by the driving gas to 2 to 12%. (These percentages are based on the assumption that the volume ratio of vaporizing gas and driving gas is 1:1.) It is necessary that the concentric tube be precisely adjusted so that the sulfur-trioxide-inert gas mixture forms a conical pattern and contacts the liquid organic compound at the periphery of the tubular reactor in a manner such that a circle is formed at the point of contact; that is, the concentric tube must not be off-center or a non-circular or elliptical pattern will be formed. The condenser E is positioned so that cooling begins immediately at the point where contact of the sulfur trioxide and organic compound occurs. This is essential in order that charring due to overheating be minimized.

After the reaction product emerges from the cooler it is separated by conventional means. The conventional separator allows the gases to be removed and the organic products are led to a continuous neutralizer from which the product is discharged in the form of an aqueous solution.

Any organic compound which is known to react with sulfur trioxide may be used in this process. For example, aliphatic saturated alcohols may be sulfated by this process. Polyhydric alcohols may also be reacted with the sulfur trioxide according to this invention. Olefinic compounds are also susceptible to the process. For example, aliphatic olefins having one or more double bonds may be converted to sulfonated products by this process. Aromatic hydrocarbons and alkylated aromatic hydrocarbons (e.g., dodecylbenzene) may also be treated with sulfur trioxide as described. Polycyclic hydrocarbons and heterocyclic compounds may also be reacted with sulfur trioxide according to the process of this invention.

Preferably, the process of the present invention will be applied to aliphatic saturated alcohols containing about 8–22 carbon atoms; the alcohol sulfates manufactured by means of this process will be water-white or near water-white after neutralization. When unsaturated alcohols are reacted with sulfur trioxide by this process, the sulfonated products will be of lighter color than obtained heretofore by $SO_3$ sulfonation. Furthermore, the isolated products will be of superior quality than obtained heretofore.

The sulfur trioxide used to carry out this process may be obtained from several sources. For example, it may be obtained by vaporizing liquid sulfur trioxide, from oleum, from converter gas (which contains about 10% sulfur trioxide) or from other sources. The inert gas used to dilute the sulfur trioxide and used also to maintain the organic compound in turbannular flow may be air, nitrogen, carbon dioxide or other gas which is inert in the reaction medium.

As indicated, part of the inert gas is fed into the tubular reactor at point D and the organic compound is introduced at point B and turbannular flow is establishd. By turbannular flow it is meant that the liquid (that is, the organic compound) is being propelled through the tube and is distributed circumferentially over the entire inside of the tube thus forming a liquid annulus surrounding a void along the axis of the reactor tube (see, for example, the disclosure in U.S. Patent 2,528,320). The velocity of the inert gas inserted at point D is adjusted so that turbannular flow is obtained. Normally the driving gas will have a superficial gas velocity of from about 30 to about 50 feet per second. The superficial gas velocity of the inert gas —$SO_3$ mixture will range from 150 to 400 feet per second. The resulting velocity of the gas stream at the point of contact with the organic compound will be from 60 to 110 feet per second. The volume ratio of vaporizing gas to driving gas can vary from about 1:1 to 1:2 although a ratio of about 1:1 is preferred.

The combined vaporizing and driving gas should have sufficient velocity so that turbannular flow is maintained for at least the distance required to complete reaction under conditions of turbannular flow. The mixture of $SO_3$ and the inert gas which passes through concentric tube C emerges from tube C in a conical pattern and, as indicated previously, contacts the organic compound at the periphery of the reactor tube. It has been found that unless the concentric tube C is truly concentric, and unless the $SO_3$ gas mixture issuing from it is conical, charring occurs and the benefits of this process are partially lost. Thus, the alignment of tube C is critical. The actual reaction between the sulfur trioxide and the organic compound begins just before the reagents enter the cooler. It is important that the product enter the cooler immediately after reaction has begun to avoid any overheating.

The reagents are normally introduced into the reactor at room temperature, unless the organic compound is a solid at room temperature. In that event, the organic compound is first melted by a preheater arrangement and is fed into the reactor at an elevated temperature in order to keep it in liquid form. Alternately, the organic compound may be dissolved in an inert solvent if it is solid at room temperature.

In order to more easily observe the over-all process of this invention reference is made to Figure II. Unit 1 is a dryer through which the gas passes and is dried prior to its introduction into the vaporizer and also the reactor tube 5. The storage supply tank 2 holds the sulfur trioxide which passes into the vaporizer and subsequently into the concentric tube within the tubular reactor. The storage supply tank 4 holds the organic reactant which passes into the tubular reactor and is placed into turbannular flow by the driving gas. The cooler 7 surrounds the tubular reactors 5 and 6. A separator 8 passes the waste gas to a scrubber 9, and product goes to 10, a continuous neutralizer. After the product is neutralized with caustic or other alkaline material it is packaged.

The following representative examples illustrate the present invention.

*Example 1*

Using an apparatus as described a mixture of 0.66 lb. per hour of liquid sulfur trioxide and 29 (S.T.P.)[1] cu. ft./hr. of vaporizer air was passed through the tube concentric with the tubular reactor. The mole ratio of sulfur trioxide to fatty alcohol was about 1:1 and the ratio of vaporizing air to driving air was 1:1. The concentration of the $SO_3$ in the reactor at the point of contact was about 5% by volume. Then, 29 (S.T.P.)[1] cu. ft./hr. of driving air was introduced in the tubular reactor and technical lauryl alcohol was fed into the reactor at a rate of 1.65 lbs. per hour. Cooling water at approximately 22° C. was passed through the cooling condenser and the reaction product was neutralized continuously was 4.2 lbs. per hour of aqueous 8% by weight sodium hydroxide solution. Product was obtained at 6.4 lbs. per hour. Recovery was 98.5% and the product contained 35% active ingredient. The product was reduced to approximately 30% active ingredient to yield a clear, practically water-white product which analyzed 20.7% sulfated fatty alcohol and 1.91% unsulfated material.

*Example 2*

Example 1 was repeated except that 1.535 lbs. per hour of technical lauryl alcohol was fed into the tubular reactor. The concentration of sulfur trioxide in the gas phase at the point of contact with the organic compound was about 5% by volume. The molar ratio of sulfur trioxide to fatty alcohol was about 1:0.93. The ratio of vaporizer air to driving air was 1:1.

The effluent reaction product was neutralized continuously with 4.15 lbs. per hour of 8% aqueous sodium hydroxide solution as in Example 1. The product was recovered at a rate of about 6.18 lbs. per hour (97.5% material recovery). The product had about 35% active ingredient. The color of the final product was a trace yellow. The average analysis was 23.5% sulfated fatty alcohol, 1.6 lbs. sulfated fatty alcohol.

*Example 3*

Using the apparatus described technical oleyl alcohol (iodine number 60) was introduced into the inlet of the tubular reactor at the rate of 1.863 lbs. per hour, the driving air being fed in at a rate of 28.25 (S.T.P.) cu. ft. per hour to maintain turbannular flow. The mixture of sulfur trioxide and vaporizer air fed into the concentric tube of the reactor was obtained by introducing liquid sulfur trioxide to the vaporizer at a rate of 0.66 lb. per hour and the air at the rate of 18.18 (S.T.P.) cu. ft. per hour. The reaction mass passing into the cooler, which was cooled with water of 25° C. was discharged from a cycline separator and neutralized with 5.6 lbs. per hour of 6% aqueous sodium hydroxide solution.

The product obtained was a very satisfactory commercial material.

*Example 4*

Using the equipment described, an adduct of technical oleyl alcohol with 1.5 moles of ethylene oxide was sulfonated and sulfated by feeding the liquid organic compound at a rate of 1.5 lbs./hr. and driving air at a rate of 26.8 (S.T.P.) cu. ft./hr. into the tubular reactor, the sulfur trioxide and vaporizing air flowing through the concentric tube at rates of 0.482 lb./hr. and 15–35 (S.T.P.) cu. ft./hr., respectively. The concentration of $SO_3$ vapor at the point of contact with the organic compound was 5% by volume. The reaction mass was cooled with water at 26° C. and then the product kept in liquid form by passing it through steam jacketed tubes until it was discharged from a cyclone separator after which it was continuously neutralized with 3.77 lbs./hr. of a 6% aqueous sodium hydroxide solution. Simultaneously with the neutralization, a liquid diluent was added at a rate of 1.0 lb./hr. to reduce the viscosity of the mass. The product was obtained at 6.74 lbs. hr. and contained 22.6% sulfated and/or sulfonated alcohol and 6.5% total of diluent and unreacted material.

*Example 5*

In the equipment described, 1.3 lbs./hr. dodecylbenzene was contacted with 0.50 lb./hr. $SO_3$. The $SO_3$ was obtained by heating 24% oleum. The vaporizer air flow rate was 18.65 (S.T.P.) cu. ft./hr. and the driving air was introduced at a rate of 25.55 (S.T.P.) cu. ft./hr. A jacket around the tubular reactor was operated with 29° C. water. Further down the reactor equipment the reaction mass was surrounded by steam heated jackets. The effluent sulfonated dodecylbenzene was neutralized batchwise. The neutralization was carried out with 75 g. sulfonation mass using 102 g. sodium hydroxide dissolved in 2500 g. $H_2O$.

The resulting product contained 16.43% sulfonated and 0.83% unreacted organic material and 0.1% $Na_2SO_4$.

The following representative specie organic compounds may be reacted according to the process of the present invention, as represented in the preceding examples, to give substantially the same results. The octyl, lauryl, myristyl, cetyl and stearyl alcohols; glycerine, glycerine monolaurate and sorbitol; and unsaturated alcohols such as oleyl and linoleyl alcohol may be reacted according to the process of the present invention. Dodecyl benzene, ---
[1] S.T.P. refers to Standard temperature and pressure; i.e., 760 mm. Hg and 0° C. to which the volume of gas is calculated.

xylene, toluene, nitrobenzene, styrene and organic compounds as set forth in General Chemical "Sulfan" brochure, identified as General Chemical Brochure "Reactions of $SO_3$," copyrighted 1948, may be reacted according to the present process.

The process of this case significantly reduces the discoloration and contamination of the products obtained by treating organic compounds with sulfur trioxide and results in a more economical process. These sulfated and sulfonated products are well known and are used primarily as surface active agents and detergents and can be prepared by several processes; e.g., reaction of the organic compound with sulfuric acid, oleum, chlorosulfonic acid or sulfur trioxide. The use of sulfuric acid, oleum, and chlorosulfonic acid are at an economic disadvantage in comparison to the use of sulfur trioxide according to the present invention. Chlorosulfonic acid has the further disadvantage that it requires removal of by-product HCl; and, by-product chlorides are present in the resulting product. Similarly, sulfuric acid and oleum also cause large amounts of sulfates in the final product. The prior art processes using sulfur trioxide usually involve solvent systems and/or mechanical equipment, such as "Votators" or rotating shafts, and are more costly than the process of this case.

The embodiments of the invention in which an exclusive property or privilege is claimed are defined as follows:

1. A process for sulfating and sulfonating an organic compound taken from the group consisting of alcohols, olefins, monocyclic aromatic hydrocarbons and polycyclic aromatic hydrocarbons, in which process sulfur trioxide is reacted with said organic compound by contacting said organic compound with a mixture of inert gas and from 2–12% by volume of the gas mixture of gaseous sulfur trioxide, said process being carried out by establishing turbannular flow of said organic compound with additional inert gas and introducing said mixture of inert gas and sulfur trioxide by feeding said mixture within and concentric to said turbannular flowing organic compound and beyond the point of full turbannular flow of said organic compound, cooling the resulting reaction mixture with room temperature water immediately beyond the point where said sulfur trioxide-inert gas mixture contacts and reacts with said turbannular flowing organic compound.

2. The process of claim 1 wherein the liquid organic compound reacted is an aliphatic saturated alcohol containing from 8 to 22 carbon atoms.

3. The process of claim 1 wherein the liquid organic compound reacted is lauryl alcohol.

4. The process of claim 1 wherein the liquid organic compound reacted is oleyl alcohol.

References Cited in the file of this patent

UNITED STATES PATENTS

| | | |
|---|---|---|
| 2,088,027 | Law et al. | July 27, 1937 |
| 2,691,040 | Bloch et al. | Oct. 5, 1954 |

FOREIGN PATENTS

| | | |
|---|---|---|
| 669,899 | Great Britain | Apr. 9, 1952 |